US005636280A

United States Patent [19]
Kelly

[11] Patent Number: 5,636,280
[45] Date of Patent: Jun. 3, 1997

[54] DUAL KEY REFLEXIVE ENCRYPTION SECURITY SYSTEM

[76] Inventor: Tadhg Kelly, 11 Block Ct., Randolph, N.J. 07869

[21] Appl. No.: 331,975

[22] Filed: Oct. 31, 1994

[51] Int. Cl.⁶ .............................. H04L 9/32; H04L 9/08
[52] U.S. Cl. .................... 380/21; 380/4; 380/25
[58] Field of Search ........................... 380/21, 25, 4

[56] References Cited

U.S. PATENT DOCUMENTS

| | | | |
|---|---|---|---|
| 4,238,853 | 12/1980 | Ehrsam et al. | 380/25 X |
| 4,652,698 | 3/1987 | Hale et al. | 380/24 |
| 4,933,971 | 6/1990 | Bestock et al. | 380/44 |
| 5,196,840 | 3/1993 | Leith et al. | 380/21 X |
| 5,202,922 | 4/1993 | Iijima | 380/45 |
| 5,434,918 | 7/1995 | Kung et al. | 380/25 |

*Primary Examiner*—Gilberto Barrón, Jr.
*Attorney, Agent, or Firm*—Siegmar Silber

[57] ABSTRACT

A security system is disclosed, which system is for granting access to a host computer in response to a demand from a remote computer. The security system has a permanent encryption key mounted on the remote computer. The software portion of the system provides for the identification number associated with the permanent encryption key to be sent unencrypted to the host computer. Using the identification number the host computer selects an encryption device and encrypts a transitory encryption key generated by the host computer and transmits the transitory encryption key to the remote for emplacement on a write-only receptor in the permanent encryption key. Thereafter a comparator in the host computer, in response to encrypted identifying data transmitted from the remote computer and encrypted with said the transitory encryption key, authenticates the access demand. Access is granted by the host computer to the remote computer upon the favorable comparison of an encrypted identifier provided by the remote computer.

27 Claims, 5 Drawing Sheets

DUAL KEY REFLEXIVE ENCRYPTION SECURITY SYSTEM

BACKGROUND OF THE INVENTION

1. Field of the Invention

This invention relates to a dual-key reflexive encryption security system, and, more particularly, to a data security system having an embedded encrypted token with various communicated control messages, including those for key management and session keys, accomplished in code.

2. Background of the Prior Art

In the past, various secure access systems or methods have been devised using a token—a physical object or hardware device that a user has in his possession when dialing into a computer. Various types of tokens are available using different schemes, among which are time-based identification and calculator-type tokens.

The time-based token is contained in a hand-held device (the token) with a small window containing an identifying number. This number changes about every 3 minutes. When signing on to a database, the security equipment is programmed to request the user's identification information. The identification of the user is linked to the token by an algorithm, and, when the identifying information is received, the security device obtains the corresponding algorithm for the specific token. During operation of the token, the algorithm is processed and generates identifying information which appears in the window of the token and changes every 3 minutes. When in response to a request for access, the same number (or, to allow for time differences, the past number or the next future number) is present at the token and at the security equipment guarding the database, access is provided to the user. All the transactions between the user and security device are public transmissions and are not encrypted.

In the calculator-type token, the user presents identifying information and optionally a password to the security equipment guarding the database and, in return, the security equipment sends a number to user. Then, the user keys the returned data into the calculator-type token which, using an algorithm, processes the data so that a different number appears in the window of the token. This number is sent by the user to the security equipment and, if the numbers both having passed through the same algorithm match, the user is allowed access to the database. All these transactions are public transmissions and are not encrypted. Some of the calculator-type tokens use the data encryption standard (DES) as the algorithm, with each calculator-type token having an individual key, but all data transmitted to and from the user to the security equipment is in the clear.

In addition to the above background information and in the course of preparing for this application, several patents became known to the inventor hereof. These patents are shown in the tabulation below.

| ITEM NO. | U.S. PAT. NO. | INVENTOR | ISSUE DATE |
| --- | --- | --- | --- |
| 1 | 5,237,614 | Weiss, K. F. | 08/17/93 |
| 2 | 5,175,766 | Hamilton, S. B. | 12/29/92 |
| 3 | 5,138,712 | Corbin, J. R. | 10/21/75 |

In considering the various patents known to the inventor hereof the following discussion is provided:

U.S. Pat. No. 5,237,614—Weiss, K. F.

The patent to Weiss shows an integrated network security system which permits a log-on to a normally locked client on the network in response to at least one coded non-public input to the client by a user. At least a selected portion of the coded input is encrypted and sent to a network server where the user is authenticated. After authentication, the server preferably returns a decryption key, an encryption key for future use and any critical files previously stored at the server to the client. The decryption key is utilized to decrypt any material at the client which were encrypted when the client was locked, including any material sent from the server, thereby unlocking the client. The decryption key may be combined with untransmitted portions of the original coded input in a variety of ways to generate an encryption key for the next time the terminal is to be locked. When one of a variety of client locking conditions occurs, the previously generated encryption key is utilized to encrypt at least selected critical material at the client. Critical directories or the like in encrypted form may be sent to the server and a message is sent to the server that the client is locked, which message is utilized by the server to inhibit the client from further access to at least selected resources on the network.

U.S. Pat. No. 5,175,766—Hamilton, S. B.

The Hamilton patent discloses a method of communicating with a data encryption device. A data encryption device adapted for providing encryption functions such as data encryption and decryption may be controlled with an inventive signalling protocol which provides two-way symmetrical messaging. Data encryption messages are sent to a data encryption device with a message packet which includes a start of message character, a token field, a token dependent data field, a token delimiter and an end of message character. A response message is generated after the data encryption function is performed, with the exception that the token dependent data comprises data which was processed in accordance with the requested function.

U.S. Pat. No. 5,138,712—Corbin, J. R.

The patent to Corbin teaches a software application with verification and license check out functions which are normally performed by a license server of a network software license system. The encrypted license information is contained in a license token, and is sorted in the database controlled by the license server. In contrast to systems in which the license server either grants or denies the request after verifying the user's credentials, the Corbin patent teaches a license server system which finds the correct license token for the software application and transmits the license token to the licensing library. In application specific license access module attached to the application decodes the licensing token. Before updating the license token, the license status is checked by routines in the licensing library that are coupled to the software application and verify the license information. The application specific license access module then encodes the updated license token before returning it to the license server. Thus, the impact of breaching the encryption/decryption of an application is limited to only one application. As a result, improved network-wide protection against unauthorized use of software applications in a network of computers is provided.

With the various types of tokens discussed above, namely, the time-based identification and calculator-type tokens, several technical problems remain. In the time-based approach, during the time a user is attempting to sign on, there is a three-minute window for an eavesdropper who could have intercepted the data, to place a call to another database in the same network which is protected by the same security equipment. The eavesdropper is now armed with knowledge of the identifying information; where applicable, the password; and, the required response upon a challenge.

All of this information has been publicly sent and is readily obtained. As specific networks or companies customarily use the same security equipment at different locations to protect the databases, each location has the same directory of users with the same identifying information and passwords and each location has the same user algorithm embedded within the security equipment.

In the case of the calculator-type token, here the technical problem is somewhat similar inasmuch as the eavesdropper can also intercept the flow of data between the caller and security equipment. Upon doing so, the eavesdropper can uncover the user identifying information, the password and the number-to-be-keyed into the calculator along with the result (the response). With the number-to-be-keyed and the response, a computer program can be developed to derive the DES key for the resulting encryption.

The inclusion herein of the above-listed patents is not intended as an admission that any such patent constitutes prior art against the claims of the present application. Applicant does not waive any right to take any action that would be appropriate to antedate or otherwise remove any listed patent as a competent reference against the claims of the present application.

SUMMARY

In general terms, the invention disclosed hereby includes a security system for granting access to a host computer in response to a demand from a remote computer. The security system has a permanent encryption key mounted on the remote computer. The software portion of the system provides for the identification number associated with the permanent encryption key to be sent unencrypted to the host computer. Using the identification the host computer selects an encryption device and encrypts a transitory encryption key generated by said host computer and transmits the transitory encryption key to the remote for emplacement on a write-only receptor in the permanent encryption key. Thereafter a comparator in the host computer, in response to encrypted identifying data transmitted from the remote computer and encrypted with said the transitory encryption key, authenticates the access demand. Access is granted by the host computer to the remote computer upon the favorable comparison of an encrypted identifier provided by the remote computer.

OBJECT AND FEATURES OF THE INVENTION

It is an object of the present invention to provide a system for more secure technique for data access.

It is a further object of the present invention to provide a system of encrypted communications for access clearance purposes.

It is yet another object of the present invention to provide an embedded token, the algorithm of which is not communicated in the clear during the clearance process.

It is still yet another object of the present invention to provide a data security system with integrated advanced modem management capabilities.

It is a feature of the present invention that the key management communications are encrypted.

It is another feature of the present invention that the session key communication is encrypted.

Other objects and features of the invention will become apparent upon review of the drawings and the detailed description which follow.

BRIEF DESCRIPTION OF THE DRAWINGS

In the following drawings, the same parts in the various views are afforded the same reference designators.

DESCRIPTION OF THE PREFERRED EMBODIMENT

The proprietary software of the this invention has two portions, namely, the authentication portion at one or multiple central sites termed herein host computers and a software driver portion at each of the access-seeking sites termed herein remote computers. The host and remote computers are usually connected by dial up modems. The remote computers are equipped with the previously mentioned software along with an encryption token, such as a DES token. The remote computer software is a software driver that communicates between a standard communications package and the DES token. In the system, the remote computer software is first used to ascertain security system presence before the communications program is engaged. In initiating the security system, the remote computer software utilizes a PIN (Personal Identification Number) number locally to verify the DES token to the remote computer. The user is not informed at this time if the PIN fails so as not to provide clues to an eavesdropper or a potential intruder. The authentication process described in detail below then ensues.

The security device of this invention and the security system formed thereby employ dual-key reflexive encryption. Dual-key reflexive encryption is defined as a method or means of encryption in which two coding/decoding keys are used, the first coding/decoding key being permanent to each of two or more stations requiring secure communications and the second coding/decoding key being transitory and being generated for the transaction underway, and further the transitory key is sent encrypted by the permanent key to the station requesting access, which station decodes the transitory key, and reflexively encrypts data known to both stations, and retransmits the reflexively encrypted data for decoding and comparison at the other station.

Figure 1:
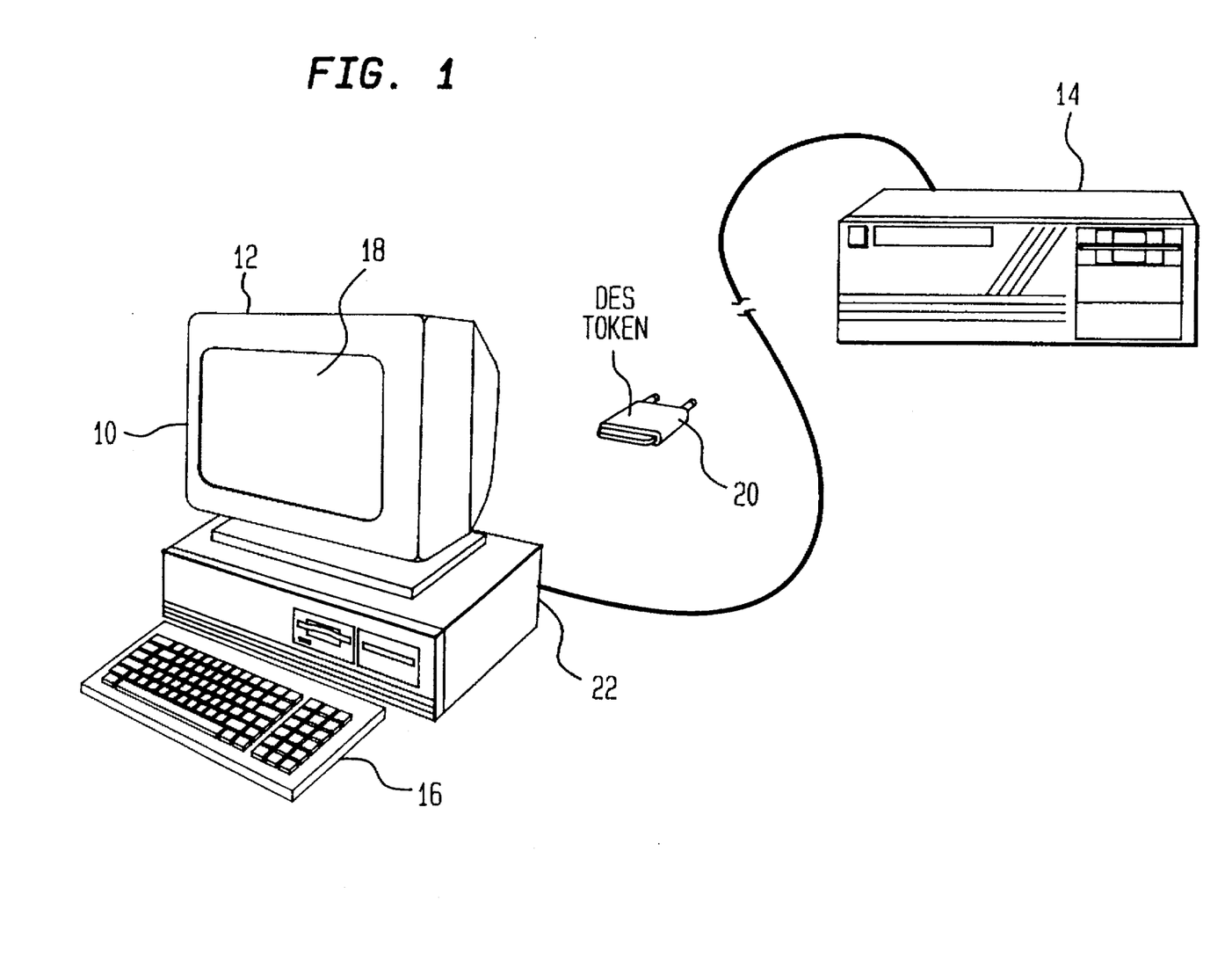
FIG. 1 is a perspective view of the dual-key reflexive encryption security system of the present invention, showing the remote computer, the encryption token, the interconnecting devices, and the host computer containing the protected database and the communications network therefor.

A security device of this invention is shown in FIG. 1 and is referred to generally by the numeral 10. The device together with the proprietary software and the method of use thereof, described in detail hereinbelow, provides an innovative security and computer access management system for all types of computer-based communications systems. The system includes a remote computer 12 and a host computer 14 with encrypted data flowing therebetween. The security device 10 is structured with the proprietary software thereof installed within the computers of the system and embedded within an integrated circuit (IC) chip (not shown). A computer keyboard 16 is provided for data input and a monitor or matrix display 18 is provided for data display. A DES (data encryption standard) token 20 mounted at parallel printer port 22 of remote computer 12 and the management software (described hereinbelow) are arranged to provide for cooperative functioning with host computer 14. Although a DES token is indicated herein, any encryption token can be employed which is compatible with the software programs.

Figure 2:
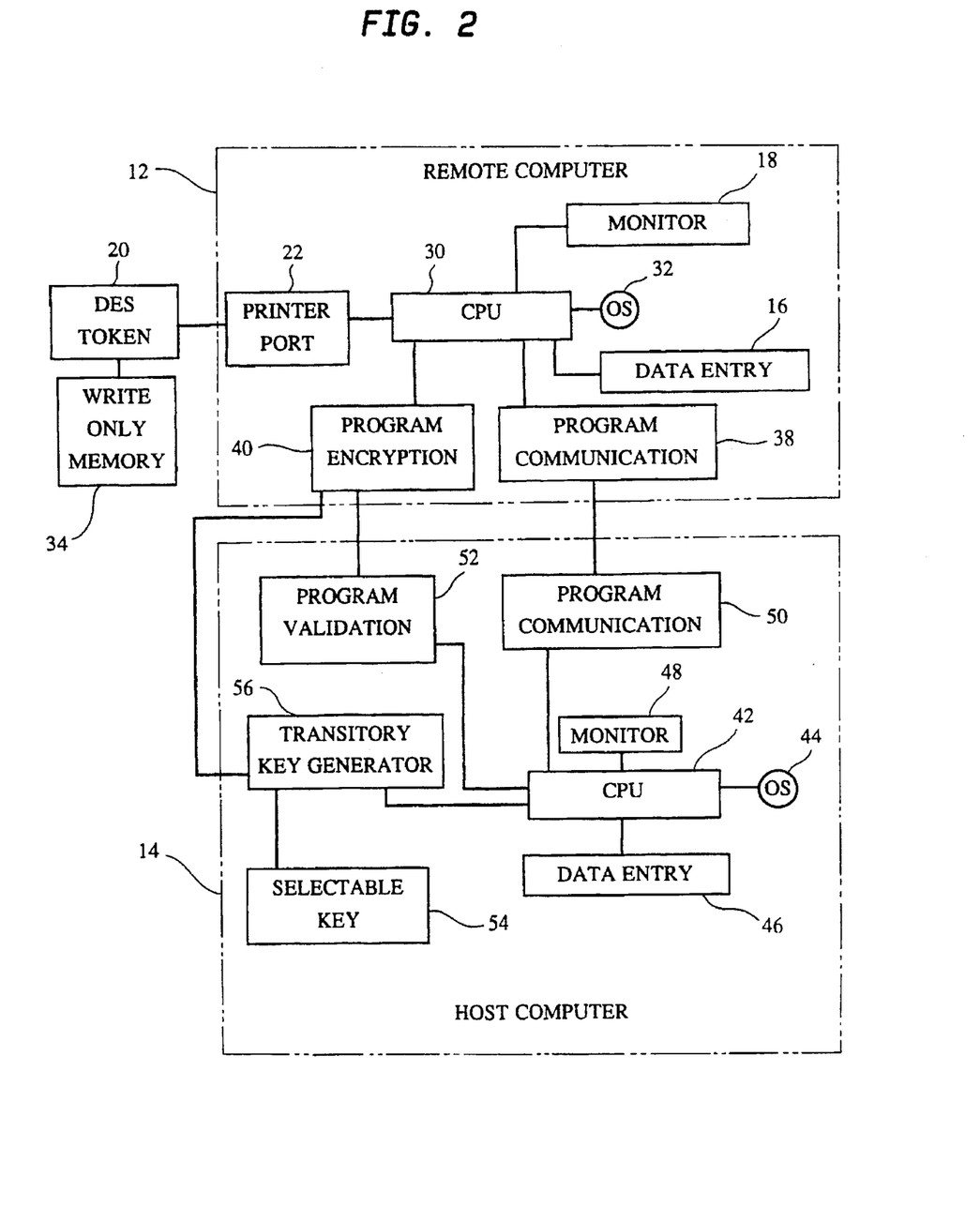
FIG. 2 is a system block diagram of the dual-key reflexive encryption security system of the invention shown in FIG. 1.

Referring now to FIG. 2, a system block diagram is shown with the remote computer 12 thereof having a central processing unit (CPU) 30 supported by an operating system 32. For data entry, the CPU 30 has an associated keyboard 16 and, for display purposes, a monitor 18. The output of the CPU 30 has a parallel printer port 22 into which a DES token or equivalent 20 is inserted. The token 20 has a write-only portion 34 onto which a transitory or session key 36 is emplaced. For purposes of the specification which follows the term "session key" means a transitory encryption key generally used for a single transaction and emplaced on a write-only portion of the permanent key without retrieval available. Installed in the CPU 30, is a communications program 38 for initiating and maintaining communications between computers 12 and 14 and a key management program 40 which is a software driver for managing the information flow between the communications program 38 and the DES token 20. The lower portion of the block diagram shows the host computer 14 which has a host computer CPU 42 supported by the operating system 44. For data entry, the CPU 42 has an associated keyboard 46 and, for display purposes, a monitor 48. Installed in the CPU 42, is a communications program 50 which, once access is provided functions cooperatively with communications program 38 and a validation or authentication program 52. In the course of validation as is described below, a selectable encryption key 54 and a transitory encryption key generator 56 are controlled by validation program 52.

Figure 3:
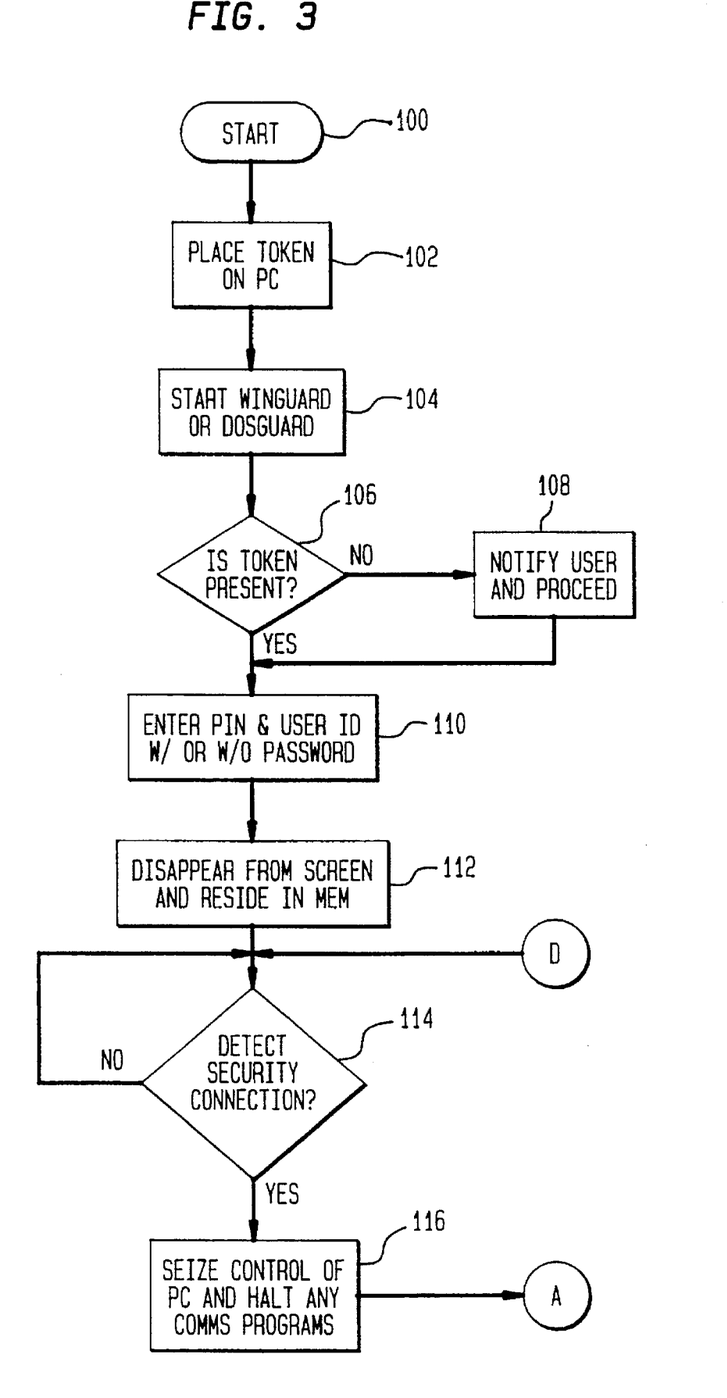
FIG. 3 is a partial flow chart showing the entry portion of the security program of the system shown in FIG. 2 and the interrelationships thereof to the remaining partial flow charts.
Figure 4:
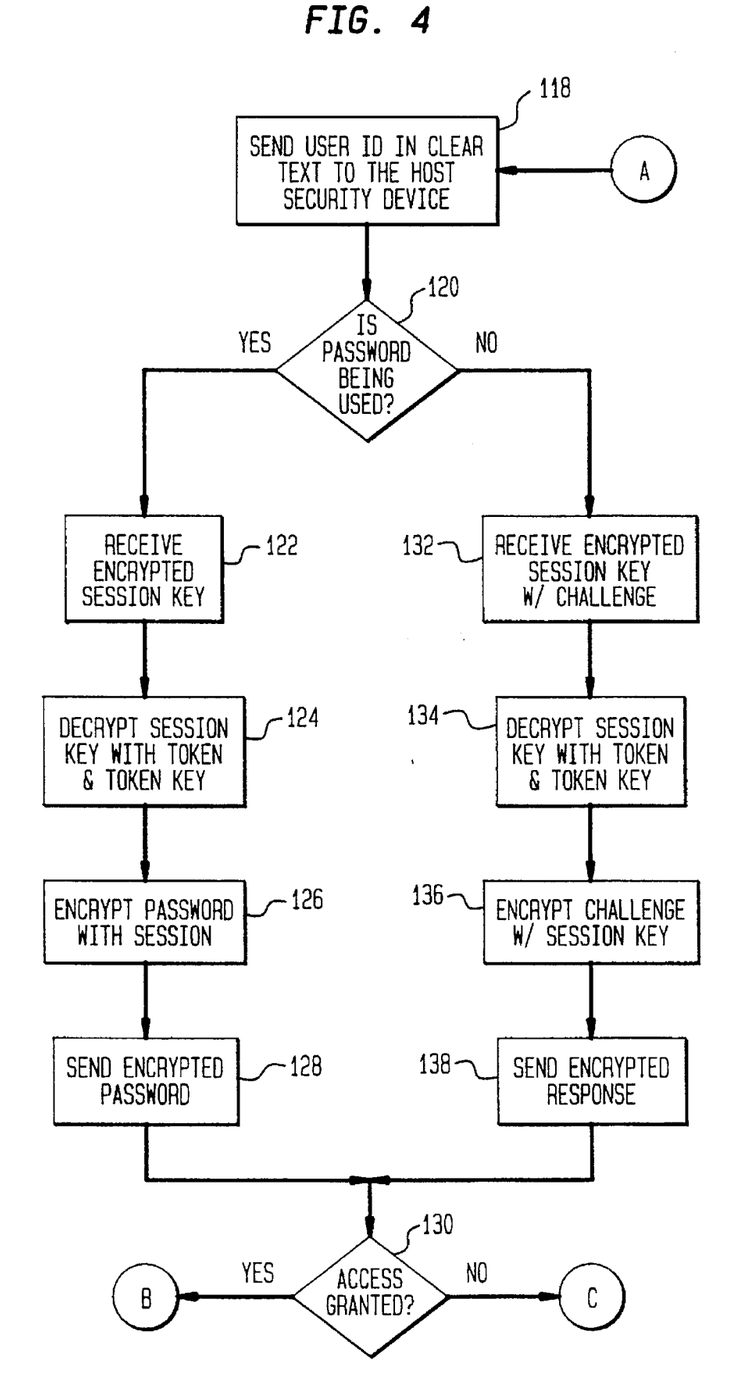
FIG. 4 is a partial flow chart showing the authentication portion of the security program of the system shown in FIG. 2 and the interrelationships thereof to the remaining partial flow charts; and, FIG. 5 is a partial flow chart showing the final portion of the security program of the system shown in FIG. 2 and the interrelationships thereof to the remaining partial flow charts.
Figure 5:
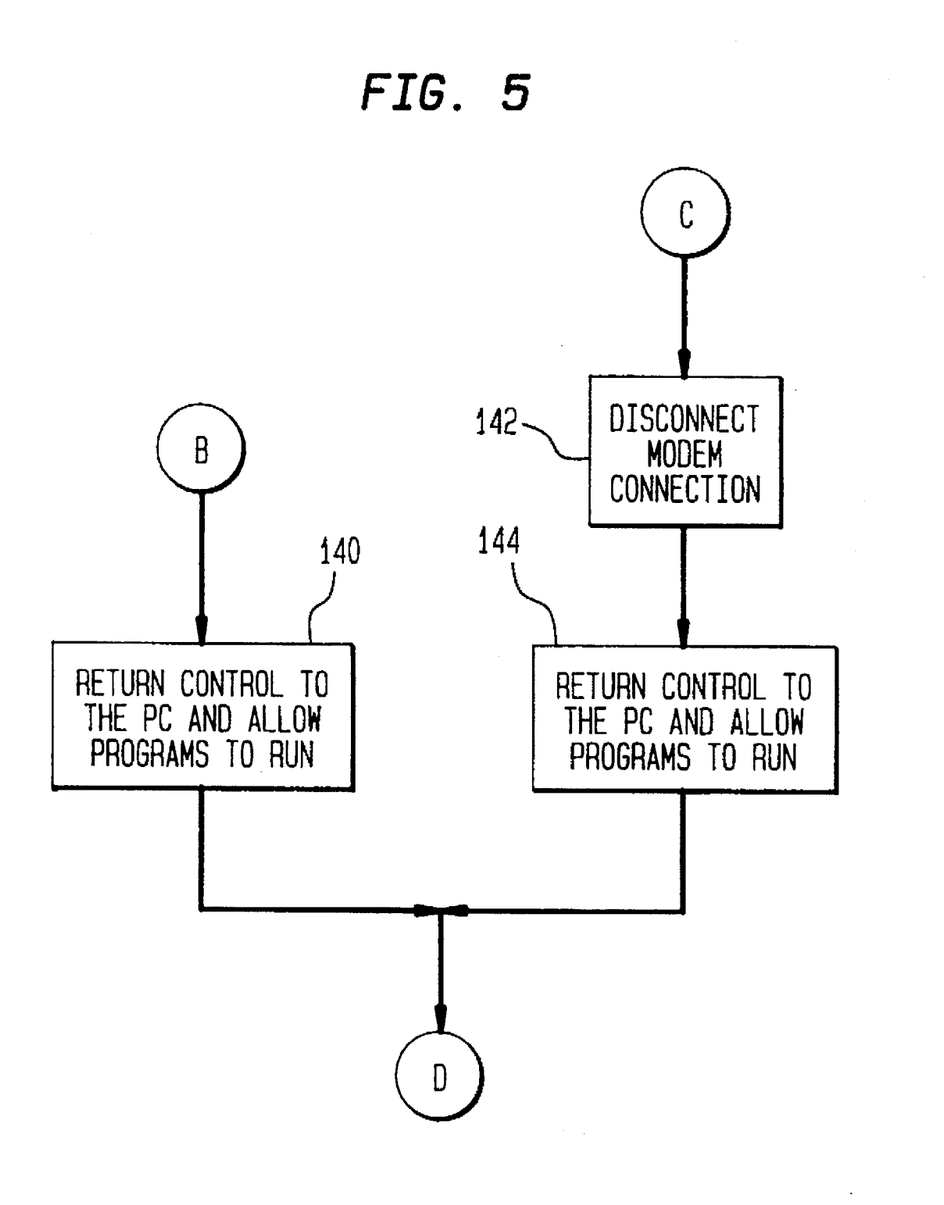

Referring now to FIGS. 3 through 5, the flow diagrams for the security system of this invention are now shown. The logic that follows reflects the user inputs and the programmed processes. The logical pathway commences with power being supplied to the CPU 30 at START block 100. Upon power being supplied to the CPU 30, the user requesting access to the host computer from the remote computer is immediately prompted to attach the token to the parallel printer port of the remote computer at PLACE TOKEN ON PC block 102. The token attached to the printer port is optionally a data encryption standard (DES) token or an equivalent thereof. As will be seen hereinbelow the equivalency requirement includes the ability at the token to have a write-only receptor and to have a local (at the remote computer) PIN number verification capability. Thereupon the security program is selected at the menu therefor and at START WINGUARD OR DOSGUARD block 104. The user is then immediately prompted by IS TOKEN PRESENT? block 106. If the token is not present, the user receives notification thereof at the NOTIFY USER AND PROCEED block 108. If the token is present, the user receives a prompt to enter data at the ENTER PIN & USER ID W/OR W/O PASSWORD block 110. The program of this invention is constructed to operate under two protocols, namely, those systems in which a password is encrypted using a session key and those systems in which challenge data is retransmitted in encrypted form using a session key. Although data entry is described herein as being entered through a keyboard, data entry through other methods, such as a magnetic stripe reader as is commonly encountered at an automatic teller machine (ATM), are also within the teaching hereof. After an appropriate time delay, the display of entered data ceases at the DISAPPEAR FROM SCREEN AND RESIDE IN MEM block 112. Thereupon, the program completes the "log on" phase with the detect and seizure procedures at the DEDECT SECURITY CONNECTION? and SEIZE CONTROL OF PC AND HALT ANY COMMS PROGRAMS blocks 114 and 116, respectively. This phase is only completed, if the host computer is equipped with a corresponding authentication program and, upon recognition thereof, the progress of the communications programs in place are arrested pending authentication or validation. If the host computer is not similarly equipped, the security system hereof recedes and is transparent to on-going operations.

Referring now specifically to FIG. 4, the authentication or validation process is next described. The description first follows a pathway in which the password is used and then one in which challenge data is used. An initial clear transmission of identifying data is accomplished in unencrypted form at the SEND USER ID IN CLEAR TEXT TO THE HOST SECURITY DEVICE block 118. Upon the user identification data being received, the security system responds to the query IS PASSWORD BEING USED? block 120. If a password is being used, the host portion of the system generates a session key and having identified the permanent key resident at the remote computer, selects the corresponding key at the host computer and encrypts the session key therewith. This encrypted key is transmitted to RECEIVE ENCRYPTED SESSION KEY block 122 and is emplaced on the write-only portion of the token. At the remote computer, the program hereeof is constructed to enable decryption of the session key at DECRYPT SESSION KEY WITH TOKEN & TOKEN KEY block 124 and subsequently to further provide identifying data to the host computer by enabling the encryption of the password at ENCRYPT PASSWORD WITH SESSION block 126. Thereafter, the encrypted portion of the identifying data is sent to the host computer at SEND ENCRYPTED PASSWORD block 128 and the host computer then responds to the query ACCESS GRANTED? block 130. If a password is not being used, the host portion of the system generates a session key with a challenge data stream and having identified the permanent key resident at the remote computer, selects the corresponding key at the host computer and encrypts the session key therewith. This encrypted key is transmitted with the challenge data to RECEIVE ENCRYPTED SESSION KEY W/CHALLENGE block 132 and is emplaced on the write-only portion of the token. At the remote computer, the program hereeof is constructed to enable decryption of the session key at DECRYPT SESSION KEY WITH TOKEN & TOKEN KEY block 134 and subsequently to further provide identifying data to the host computer by enabling the encryption of the challenge data at ENCRYPT CHALLENGE W/SESSION KEY block 136. Thereafter, the encrypted portion of the identifying data is sent to the host computer at SEND ENCRYPTED RESPONSE block 138 and the host computer then responds to the query ACCESS GRANTED? block 130. When, after using both the permanent and the transitory keys, either pathway presents reflexively the encrypted identifying data to the host computer, the data is decoded and compared to the retained record thereof and a response is rendered.

Now referring to FIG. 5, the last phase of the program is shown. If the comparison at the host computer is favorable, the seizure that occurred at block 116 is terminated and the communications program is now resumed at RETURN CONTROL TO TEE PC AND ALLOW PROGRAMS TO RUN block 140. If the comparison at the host computer is not favorable, the access request is denied at DISCONNECT MODEM CONNECTION block 142 and the seizure that occurred at block 116 is terminated by the communications program now being resumed at RETURN CONTROL TO THE PC AND ALLOW PROGRAMS TO RUN block 144.

In operation, security is provided for a host computer by having a sophisticated encryption methodology. The remote computer, in order to participate in the system, is equipped with a dedicated encryption key and an encryption program. The encryption program, upon the remote computer making an access demand on the host computer, functions cooperatively with any communications program. Similarly, the host computer, in order to participate in the system, is equipped with a validating program for authenticating access demands, which includes a selectable encryption key corresponding to the dedicated encryption key. The encryption methodology includes the steps of:

(1) upon making an access demand, detecting by the remote computer the presence of the validating program in the host computer;

(2) entering identifying data into the dedicated encryption key of the remote computer;

(3) interrupting the communications program of the remote computer while the remote computer undergoes authentication processing by the host computer, the authentication processing comprising the substeps of:
 (a) sending unencrypted an identification number or account number portion of the identifying data from the remote computer to the host computer;
 (b) by use of the selectable encryption key, sending encrypted a session key from the host computer to the remote computer;
 (c) by use of the dedicated encryption key, decoding at a remote computer the encrypted session key;
 (d) by use of the session key at the remote computer, sending encrypted a password or challenge portion of the identifying data from the remote computer to the host computer;
 (e) completing authentication at the host computer by decrypting the second portion of the identifying data and comparing the same to a record thereof;

(4) upon authentication, connecting the remote computer to the host computer; and, (5) resuming the communications program to provide access by the remote computer to the host computer.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed is:

1. A security system for granting access to a host computer in response to a demand from a remote computer, each said computer having a central processing unit (CPU), an operating system, and a printer port, said security system comprising;
 a permanent encryption key mounted on said remote computer, said permanent encryption key having an associated identifier;
 a selectable encryption key in said host computer providing corresponding coding/encoding to said permanent encryption key and selectable utilizing said associated identifier;
 a transitory encryption key generated in said host computer and transmitted to and emplaced within the remote computer for use thereby;
 comparator means in said host computer for authenticating access demands in response to encrypted identifying data transmitted from said remote computer and encrypted with said said transitory encryption key;
 whereby access is granted by the host computer to the remote computer upon said unencrypted identifier provided by the remote computer enabling the selection of said selectable encryption key, the encryption therewith of a transitory encryption key and the transmission thereof to said remote computer, and the successful comparison at the host computer of encrypted identifying data encrypted with the transitory key at the remote computer.

2. A security system as described in claim 1 further comprising:
 validating program in said host computer for authenticating access demands, said validating program having a transitory encryption key; and,
 an encryption program in said remote computer capable of detecting, upon the occurrence of an access demand, the presence of said validating program in said host computer.

3. A security system as described in claim 2 wherein said unencrypted identifying data is an identification number and said encrypted identifying data is a password.

4. A security system as described in claim 3 wherein said encryption program at said remote computer using the permanent encryption key, decodes the transitory key received from the host computer, and, using the transitory key, encodes the password for reflexively transmission to the host computer, said validating program means authenticating the access demand by decoding the encrypted password and comparing the same to a record thereof.

5. A security system as described in claim 4 wherein said permanent encryption key is a data encryption standard (DES) token and wherein after decoding, said transitory key is placed on a write-only portion of said DES token.

6. A security system described in claim 3 wherein said remote computer has installed therein a communications program, wherein upon the remote computer detecting said validating program, the encryption program interrupts said communications program during said authenticating procedures; and, upon authentication, resumes said communications program.

7. A security system as described in claim 1 wherein said unencrypted identifying data is an identification number and said encrypted identifying data is a challenge statement received encrypted from the said host computer using the selectable encryption key.

8. A security system as described in claim 7 wherein said encryption program at said remote computer using the permanent encryption key, decodes the transitory key received from the host computer, and, using the transitory key, encodes the challenge statement for reflexively transmission to the host computer, said validating program means authenticating the access demand by decoding the encrypted challenge statement and comparing the same to a record thereof.

9. A security system as described in claim 8 wherein said permanent encryption key is a data encryption standard (DES) token and wherein after decoding, said transitory encryption key is placed on a write-only portion of said DES token.

10. A security system described in claim 9 wherein said remote computer has installed therein a communications program, wherein upon the remote computer detecting said validating program, the encryption program interrupts said communications program during said authenticating procedures; and, upon authentication, resumes said communications program.

11. A method of providing security for a first computer in a system having a second computer making access demands upon said first computer, said second computer having installed thereon a permanent encryption key and an encryption program therefor, said first computer having a validating program for authenticating access demands including a selectable encryption key corresponding to said permanent encryption key, said method comprising the steps of:

(1) upon making an access demand, detecting by the second computer the presence of said validating program in said first computer;

(2) entering identifying data into said permanent encryption key of said second computer;

(3) authenticating said access demand by said first computer by a dual-key reflexive encryption transmission from said second computer and by an acceptable comparison of the decoded form thereof at said first computer;

(4) upon authentication, connecting said second computer to said first computer; and, (5) providing access by said second computer to said first computer.

12. A method as described in claim 11 wherein said identifying data is an identification number and a password.

13. A method as described in claim 12 wherein step (3) further comprises the substeps of:

(a) sending unencrypted an identification member from said second computer to said first computer;

(b) by use of said selectable encryption key, sending encrypted a transitory key from said first computer to said second computer;

(c) by use of said permanent encryption key, decoding at the second computer said encrypted transitory key;

(d) by use of said transitory key at the second computer, sending encrypted said password from said second computer to said first computer; and, (e) completing authentication at the first computer by decrypting said password and comparing the same to a record thereof.

14. A method as described in claim 13 wherein said permanent encryption key is a data encryption standard (DES) token and wherein said transitory key is placed on a write-only portion of said DES token.

15. A method as described in claim 14 wherein said second computer has installed therein a communications program, said method further comprising the step of:

upon the second computer detecting said validating program, interrupting said communications program during said authenticating procedures; and, said method further comprising the step of:

upon authentication, resuming the communications program.

16. A method as described in claim 11 wherein said identifying data is an identification number and a challenge statement.

17. A method as described in claim 16 wherein step (3) further comprises the substeps of:

(a) sending unencrypted an identification number from said second computer to said first computer;

(b) by use of said selectable encryption key, sending encrypted transitory key with a challenge statement from said first computer to second remote computer;

(c) by use of said permanent encryption key, decoding at the second computer said encrypted transitory key;

(d) by use of said transitory key at the second computer, sending encrypted said challenge statement from said second computer to said first computer;

(e) completing authentication at the first computer by decrypting said challenge statement and comparing the same to a record thereof.

18. A method as described in claim 17 wherein said permanent encryption key is a data encryption standard (DES) token and wherein said transitory key is placed on a write-only portion of said DES token.

19. A method as described in claim 18 wherein said second computer has installed therein a communications program, said method further comprising the step of:

upon the second computer detecting said validating program, interrupting said communications program during said authenticating procedures; and, said method further comprising the step of:

upon authentication, resuming the communications program.

20. A method of providing security for a host computer in a system having a remote computer making access demands upon said host computer, said remote computer having installed therein a dedicated encryption key, an encryption program therefor and a communications program, said host computer having a validating program for authenticating access demands including a selectable encryption key corresponding to said dedicated encryption key, said method comprising the steps of:

(1) upon making an access demand, detecting by the remote computer the presence of said validating program in said host computer;

(2) entering identifying data into said dedicated encryption key of said remote computer;

(3) interrupting said communications program of said remote computer while said remote computer undergoes authentication processing by said host computer, said authentication processing comprising the substeps of:

(a) sending unencrypted a first portion of said identifying data from said remote computer to said computer;

(b) by use of said selectable encryption key, sending encrypted a session key from said host computer to said remote computer;

(c) by use of said dedicated encryption key, decoding at the remote computer said session key;

(d) by use of said session key at the remote computer, sending encrypted a second portion of said identifying data from said remote computer to said host computer;

(e) completing authentication at the host computer by decrypting said second portion of said identifying data and comparing the same to a record thereof;

(4) upon authentication, connecting said remote computer to said host computer; and, (5) resuming said communications program to provide access by said remote computer to said host computer.

21. A security system for granting access to a host computer in response to a demand from a remote computer, each said computer having a central processing unit (CPU), an operating system, a communications program and a printer port, said security system comprising;

a permanent encryption key mounted on said remote computer, said permanent encryption key having an associated identifier;

a selectable encryption key in said host computer providing corresponding coding/encoding to said permanent encryption key and selectable utilizing said associated identifier;

a transitory encryption key generated by said host computer and transmitted to the remote computer for use thereby;

validating program means for performing authenticating procedures, said validating progrtam means in said host computer for authenticating access demands, said validating program means including said transitory encryption key;

an encryption program in said remote computer capable of detecting, upon the occurrence of an access demand, the presence of said validating program in said host computer, and, upon the remote computer detecting said validating program, the encryption program interrupts said communications program during said authenticating procedures;

comparator means in said host computer for authenticating access demands in response to encrypted identifying data transmitted from said remote computer and encrypted with said said transitory encryption key;

said encryption program, upon completion of said authentication procedures, resumes said communications program;

whereby access is granted by the host computer to the remote computer upon said unencrypted identifier provided by the remote computer enabling the selection of said selectable encryption key, the encryption therewith of a transitory encryption key and the transmission thereof to said remote computer, and the successful comparison at the host computer of encrypted identifying data encrypted with the transitory key at the remote computer.

22. A security system as described in claim 21 wherein said unencrypted identifying data is an identification number and said encrypted identifying data is a password.

23. A security system as described in claim 22 wherein said encryption program at said remote computer using the permanent encryption key, decodes the transitory key received from the host computer, and, using the transitory key, encodes the password for reflexively transmission to the host computer, said validating program means authenticating the access demand by decoding the encrypted password and comparing the same to a record thereof.

24. A security system as described in claim 21 wherein said unencrypted identifying data is an identification number and said encrypted identifying data is a challenge statement received encrypted from the said host computer using the selectable encryption key.

25. A security system as described in claim 24 wherein said encryption program at said remote computer using the permanent encryption key, decodes the transitory key received from the host computer, and, using the transitory key, encodes the challenge statement for reflexively transmission to the host computer, said validating program means authenticating the access demand by decoding the encrypted challenge statement and comparing the same to a record thereof.

26. A security system as described in claim 25 wherein said encryption key is a data encryption standard (DES) token and wherein after decoding, said transitory key is placed on a write-only portion of said DES token.

27. A security system described in claim 26 wherein said remote computer has installed therein a communications program, wherein upon the remote computer detecting said validating proram, the encryption program interrupts said communications program during said authenticating procedures; and, upon authentication, resumes said communications program.

* * * * *